(12) United States Patent
Kellum et al.

(10) Patent No.: US 6,531,565 B2
(45) Date of Patent: Mar. 11, 2003

(54) MVTR RESIN PRODUCED WITH POST-TITANATED CR/SI/TI CATALYST

(75) Inventors: Gene E. Kellum, Orange, TX (US); Kevin J. Taylor, Orange, TX (US); Charles D. Mills, Orange, TX (US); James A. Solis, Groves, TX (US)

(73) Assignee: Chevron Phillips Chemical Company LP, Houston, TX (US)

( * ) Notice: Subject to any disclaimer, the term of this patent is extended or adjusted under 35 U.S.C. 154(b) by 0 days.

(21) Appl. No.: 09/808,802

(22) Filed: Mar. 15, 2001

(65) Prior Publication Data

US 2002/0120077 A1 Aug. 29, 2002

Related U.S. Application Data

(60) Provisional application No. 60/190,724, filed on Mar. 20, 2000.

(51) Int. Cl.⁷ .............................................. C08F 110/02
(52) U.S. Cl. .................... 526/352; 526/104; 526/106; 526/107; 526/348.1
(58) Field of Search ............................... 526/352, 348.1, 526/104, 106, 107

(56) References Cited

FOREIGN PATENT DOCUMENTS

EP         0 882 740 A1 *  9/1998

* cited by examiner

Primary Examiner—David W. Wu
Assistant Examiner—Ling-Siu Choi
(74) Attorney, Agent, or Firm—Williams, Morgan and Amerson

(57) ABSTRACT

A process is disclosed for producing polyethylene resin of broad molecular weight distribution, when formed into a film, high barrier to moisture (low MVTR (Moisture Vapor Transmission Rate) for the film). The resin is formed by polymerizing ethylene, preferably in a gas phase process or in a slurry process, using a post-titanated catalyst, that is, a catalyst wherein after initial formation of a catalyst comprising Cr—Ti-inorganic refractory support, further titanium is added to the catalyst in a post-titanation step, preferably to increase the titanium content of the catalyst to a final level preferably between 7 and 9.5 wt. %.

7 Claims, 2 Drawing Sheets

MVTR RESIN PRODUCED WITH POST-TITANATED CR/SI/TI CATALYST

This application claims the benefit of U.S. Provisional application Ser. No. 60/190,724, filed Mar. 20, 2000.

FIELD OF THE INVENTION

The present invention relates to the production of polyethylene resins which are suitable for forming film having low MVTR (moisture vapor transmission rate). The present invention especially relates to such processes for producing polyethylene resin using a heterogeneous catalyst comprising chromium and titanium on a solid support.

BACKGROUND OF THE INVENTION

The polymerization of ethylene to produce polyethylene using a catalyst comprising chromium or chromium and titanium on solid support, such as silica, has been known for several decades. An early reference in this area is U.S. Pat. No. 2,825,721 to Hogan and Banks. A second group of catalysts for ethylene polymerization are Ziegler catalysts, comprising titanium halide and aluminum alkyl, also have been extensively used to produce polyethylene. A third group of catalysts for ethylene polymerization are catalysts comprising molybdenum, as described, for example, in U.S. Pat. No. 2,692,257. However, molybdenum catalysts have not been extensively used for ethylene polymerization. More recently, a fourth group of catalysts, metallocenes, comprising a cyclopentadienyl substituted transition metal, also have come into use.

Of these four groups of catalysts, the present invention is concerned with ethylene polymerization processes using a catalyst comprising chromium on a solid support, such as a silica.

Numerous references have been published concerning use of chromium-silica catalysts for polyethylene production, including references wherein the chromium component is impregnated onto a support such as silica and references where chromium and silica are formed as a cogel. Example references wherein the catalyst is formed by an impregnation procedure include U.S. Pat. No. 2,825,721. Examples of forming the catalyst by cogelation include U.S. Pat. No. 5,115,053 (cogel of chromium and silica) and U.S. Pat. No. 5,183,792 (tergel of chromium and titanium and silica).

For the chromium-silica catalysts which include titanium as a component, the titanium is generally introduced or added to the chromium-silica catalyst in one step. Thus, for instance, U.S. Pat. No. 4,294,724 states that it is known that titanium affects the polymerization activity of silica supported chromium catalysts in a way that is of special importance in slurry polymerization. However, when titanium is co-precipitated with the silica, it produces a hydrogel which does not have sufficient strength to resist serious collapse of the pores during simple drying, such as spray drying. Accordingly, in order to take full advantage of the improvement which can be imparted to the melt index capability through the use of titanium in accordance with the prior art, the titanium had to be co-precipitated with the silica and the resulting hydrogel (cogel) dried by a more expensive azeotrope distillation or washing with a liquid oxygen-containing water soluble organic compound.

References such as McDaniel's "Supported Chromium Catalysts for Ethylene Polymerization", *Advances in Catalysis* (1985) pages 47–98, teach that the amount of titanium in the catalyst should not be high, as high titanium levels lead to sintering and reduce surface area. Thus, McDaniel states at page 78: "That titania increases the termination rate also can be seen in FIG. 14. Here the melt index, which reflects the termination rate of some co-precipitated sample, is plotted against the titania concentration. At 650° C. and 760° C. calcining temperatures, the melt index increases with titania content, but at 870° C., a peak in melt index is obtained, followed by a sharp drop. This is due to sintering, which can be considered as the earliest stages of melting. Sintering destroys the surface area and porosity of the catalyst. Although Cr/silica itself does not sinter at 870° C., the added titania does promote sintering, as impurities often lower the melting point of solids. Both activity and MI potential are diminished by sintering, and the more titania added, the more easily the catalyst sinters."

Turning now to MVTR, as pointed out in WO 96/19527 to Davis, one of the most common polyolefin polymers valued for its low moisture or water vapor transmission rate (MVTR) is high density polyethylene (HDPE). Generally, HDPE's are those which have densities at or above about 0.940 g/cc. Generally, the higher the density, the better a resin's MVTR for a given package thickness. The Davis reference refers to use of a metallocene catalyst, citing Davis' co-pending patent application U.S. Ser. No. 08/093,901 which discloses metallocene catalyst systems that can be used to produce polymers having not only excellent strength, sealing, and optical properties, but having superior water vapor transmission rates. The polymers are disclosed to have use in the packaging industry. A film is disclosed having at least one layer having a density less than about 0.935 g/cm$^3$, a $M_w/M_n$ less than about 3, a CDBI greater than about 80%. The layer includes a resin having a density about 0.90 g/cm$^3$ and an MVTR of less than about 2.25 g·mil/100 in$^2$/day. Thus, Davis is directed to improved (lower) MVTR through use of a resin having a relatively narrow MWD. Davis points out that in certain embodiments of his invention, the resin produced has a density in the range of from about 0.935 to about 0.965 g/cm$^3$, a $M_w/M_n$ less than about 3, and an article made using the resin has a water vapor transmission rate less than 0.54 g·mil/100 in$^2$/day, preferably less than 0.4 g·mil/100 in$^2$/day. Also, in *Plastics Technology*, August 1999, in an article by J. Krohn et al. titled "Keep It Dry, Optimize Moisture Barrier in PE Films", at pages 60–61, the authors state "Thus, structure 3 excelled in barrier because it was the only one to have a skin layer of higher MI resin with narrower MWD, both of which contribute inherently to better barrier."

SUMMARY OF THE INVENTION

According to the present invention, a process is provided for polymerizing ethylene to form a polyethylene homopolymer having an MWD greater than 4 and suitable for forming a film having an MVTR less than 0.3 g·mil/100 in$^2$/day, which process comprises contacting the ethylene under slurry or gas phase reaction conditions with a chromium-silica cogel catalyst containing titanium, wherein the catalyst contains titanium added in at least two steps: (1) titanium added as part of a first cogel formation, and (2) titanium added in a post-titanation step after the first cogel catalyst is formed and dried.

Preferably, the polyethylene polymer produced in accordance with the present invention has an MVTR below 0.25 g·mil/100 in$^2$/day, most preferably less than 0.2 g·mil/100 in$^2$/day.

Also, preferably the polyethylene polymer produced in accordance with the process of the present invention has an MWD greater than 4, more preferably greater than 5, and most preferably greater than 6. The MWD may be as high as 10; more preferably the high range of MWD is about 8.

The term "cogel" as used in connection with the present invention is used to embrace cogellation of two components, such as the chromium and silica, as well as cogellation of three (more precisely, a "tergel") components, such as chromium-titanium and silica.

According to a preferred embodiment of the present invention, the amount of titanium in the first cogel formation is sufficient to produce a first cogel containing between 1 wt. % and 5 wt. % titanium, more preferably 1.5 wt. % to 4 wt. % titanium, and most preferably 2 wt. % to 3 wt. % titanium, based on the dried first cogel. The amount of titanium added in the post-titanation step in accordance with the present invention preferably is sufficient so that the post-titanated catalyst contains between 5 wt. % and 15 wt. % titanium, more preferably between 6 wt. % and 12 wt. % titanium, and most preferably between 7.0 wt. % and 9.5 wt. %, based on the calcined catalyst.

For the catalyst used in the process of the present invention, preferably the amount of titanium added by post titanation and preferably also the calcination conditions for the catalyst used in the process of the present invention are controlled to produce a polymer with highly effective microstructure for MVTR performance, especially controlled with respect to the balance of MWD and long chain branching.

Preferred final calcination temperature for the catalyst used in the present invention is 1000° F. to 1600° F., more preferably 1100° F. to 1500° F., and most preferably 1200° F. to 1400° F.

Preferred heat up and calcination conditions for the catalyst used in the present invention include, after drying of the post-titanated catalyst, a heat up period in a nitrogen rich atmosphere, from a start temperature below 300° F., preferably below 200° F., up to an intermediate temperature between 500° F. and 800° F. Preferably, the catalyst is brought up to the intermediate temperature level gradually, using a ramp up rate of between 50° F. and 250° F. per hour. Preferably, the catalyst is held at the intermediate temperature for one to four hours. Then the catalyst preferably is calcined, in air, preferably at a final temperature between 1000° F. and 1600° F., more preferably between 1200° F. and 1500° F., and most preferably 1100° F. to 1400° F. Preferably, the catalyst is held at this final temperature for 2 to 48 hours, more preferably 4 to 24 hours. Preferably, the catalyst is brought up to the final temperature gradually, using a heat up rate between 50° F. and 250° F. per hour, and preferably carrying out the ramp up, between the intermediate temperature and the final calcination temperature, in an atmosphere of air.

Preferably, the resin produced with the post titanated catalyst in the process of the present invention, usually in the form of polymer flake, is extruded and pelletized under conditions to produce minimal or no changes to the polymer microstructure, including minimal or no crosslinking during this step of the process. Preferably, changes to the polymer microstructure, such as crosslinking of the polymer, is minimized or avoided by selection of extrusion configurations and conditions and also by using polymer stabilizers. The extrusion configuration and conditions can include screw speed, screw design, extrusion temperatures, and output rate. Stabilizers can include a combination of phenolic and phosphite type antioxidants.

Among other factors, the present invention is based on our finding that use of a post-titanated catalyst, that is, a catalyst prepared in two titanation steps in accordance with the present invention, produces a resin of relatively broad MWD, yet having, when formed into film, a surprisingly low MVTR. Further, we have found that the resin made using a post-titanated catalyst according to the present invention has surprisingly advantageous processing properties, particularly when the resin is processed to form film.

Resins produced under the present invention process generally require approximately 15% less extruder pressure during the film extrusion process compared to existing HDPE MVTR resins of equivalent melt index. In addition, resins produced under the present invention usually demonstrate equivalent melt strength to resins produced using standard Cr—Ti-Silica catalyst without post-titanation and approximately 10% better melt strength to competitive HDPE MVTR resins of similar melt index. The combination of lower pressure required during extrusion and higher melt strength allow the processor of the resin manufactured under the present invention to run these resins at higher processing outputs than present HDPE MVTR resins of comparable melt index values.

BRIEF DESCRIPTION OF THE DRAWINGS

There are two basic coextruded constructions utilized in applications requiring low moisture vapor transmission rate (low MVTR), a five-layer coextruded construction and a three-layer coextruded construction.

Shown in FIG. 1 is a schematic diagram showing a typical five-layer coextruded construction used for MVTR critical applications.

DETAILED DESCRIPTION OF THE INVENTION

Figure 1:
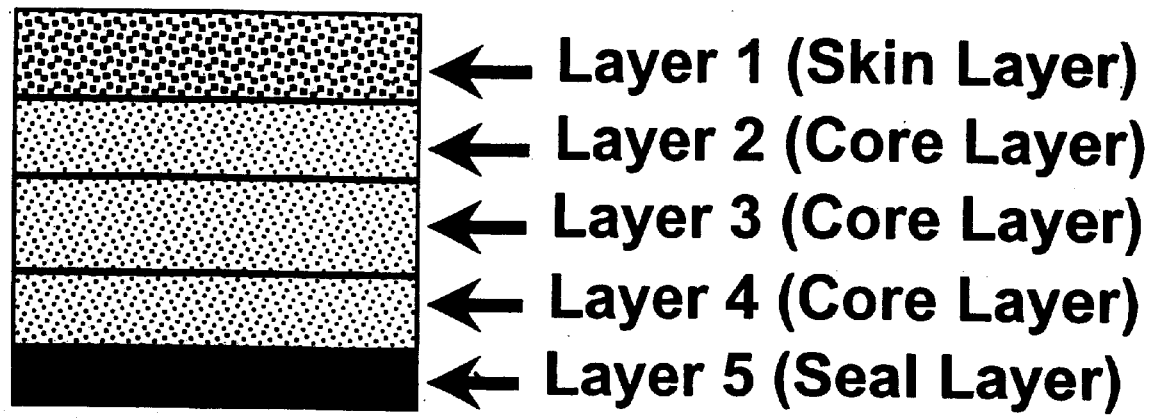

One important aspect of the present invention is the achievement of a process for producing a resin which, when formed into a film, have low MVTR, while also achieving particularly attractive processing characteristics for the resin.

MVTR (Moisture Vapor Transmission Rate) or WVTR (Water Vapor Transmission Rate), as it is sometimes called, is determined for a resin in a two-step process, involving extrusion and measurement. Resin produced in a slurry or gas phase process is first converted into film using a blown or cast film extrusion method. Since extrusion conditions have a significant effect on the MVTR exhibited, extrusion temperatures, extruder output rates, cooling rates, film gauge, die gap, and, in the case of blown film, blow-up ratio, are controlled during extrusion of the resin and held constant when comparing the MVTR properties of two or more resins.

Following the extrusion of the resin into film, the actual measurement of MVTR is performed using a Mocon Permatran-W3/31 MVTR testing system, or equivalent. The Mocon instrument for measuring water permeability was developed by Modern Controls, Inc. To accomplish the measurement, a 10×10 cm sample is cut from a random area of the film. The sample is then mounted in a sample test cell and placed in the Mocon Permatran W3/31 unit. In the unit, the test film is exposed to a constant continuous flow of dry nitrogen gas across one side of the film, exhaust side, and a constant continuous flow of controlled humidity nitrogen gas across the other side, carrier side. Water vapor passes from the humidified nitrogen side of the test cell through the film and into the dry nitrogen side of the test cell. A modulated infrared photodetection system on the exhaust side of the test cell measures the variation in the absorption of infrared energy caused by the water vapor which has transmitted through the film. By comparing the amplitude of the output signal obtained from the infrared photodetection system mounted on the test cell with the amplitude of a signal from a reference cell in the same instrument containing a film with a known transmission rate, the transmission rate of the test film is determined.

By convention, the value obtained for MVTR is expressed as grams of water transmitted per 100 square inches in a 24-hour period (or, in metric system, grams of water transmitted per square meter in a 24-hour period). This value can be normalized for film thickness by several commonly accepted methods. The MVTR values referenced in this application are normalized for film thickness by multiplying the MVTR g/100 in$^2$/day by the film thickness in mils resulting in a unit of g·mil/100 in$^2$/day.

The resins produced by the process of the present invention have a relatively high or broad MWD. MWD is the ratio of the weight average molecular weight ($M_w$) to the number average molecular weight ($M_n$).

Preferred means of determining $M_n$ and $M_w$ is by Gel Permeation Chromatography (GPC) which is also commonly known as Size Exclusion Chromatography (SEC). For the purpose of Examples 3 and 4 and other references to $M_n$ and $M_w$ in this application, molecular weight is determined using a Waters 150° C. liquid chromatograph, three linear mixed bed chromatographic columns, and hot carrier solvent of 1, 2, 4 trichlorobenzene (TCB) at 150° C. temperature. The GPC elution volume is converted to the linear-equivalent polyethylene molecular weight (M) by way of a standard calibration method using a high-density linear polyethylene standard of known Mw, Mn values and a broad molecular weight distribution. Equation (1) below is used to calculate the polymer weight fraction (W) of different molecular weights existed in the GPC effluent as detected by an online differential refractomer signal (RI). Equations (2) and (3) are used to calculate the Mw and Mn values of any unknown sample using the predetermined M values from the GPC calibration curve.

$$(W)i = \frac{(RI)i}{\sum (RI)i} \quad (1)$$

$$Mw = \left[ \frac{\sum Mi*(W)i}{\sum (W)i} \right] \quad (2)$$

$$Mn = \left[ \frac{\sum (W)i}{\sum (W/M)i} \right] \quad (3)$$

An important aspect of the present invention is the catalyst which is used for forming the MVTR resin. As indicated above, the catalyst used in the present invention is prepared by adding titanium in at least two steps. For example, a first catalyst material may be formed comprising an inorganic support silica support and preferably having 0.1 wt. % to 2 wt. %, more preferably 0.8 wt. % to 1.2 wt. %, chromium on the silica and preferably having 1 wt. % to 5 wt. %, more preferably 1.5 wt. % to 4 wt. %, titanium on the silica support, all calculated based on the total weight of the catalyst material. Preferably, the support is silica. Then, in a post-titanation step, titanium is added to the first catalyst material. The amount of titanium added in the post-titanation step preferably is 1 wt. % to 10 wt. % additional, more preferably 2 wt. % to 8 wt. % additional, again based on the weight of the silica support. Preferably, the amount of titanium added brings the total titanium to between 5 wt. % to 15 wt. %, more preferably between 6 wt. % and 12 wt. %, and most preferably between 7 wt. % and 9.5 wt. %, based on the weight of the final catalyst. Although the post-titanation may be carried out in more than one post-titanation treatment, preferably the additional titanium is added in one post-titanation treatment.

The titanium in the first catalyst material is preferably present as part of a cogel (or "tergel" more accurately) formation of a Cr—Ti-silica first catalyst material.

The first catalyst material is preferably post-titanated by an impregnation procedure, preferably using an organic titanium compound, preferably tetraisopropyl titanate, as further illustrated in the examples below.

After impregnation with the titanium compound, preferably the catalyst material is calcined, as previously described.

Another aspect of the present invention is the process conditions under which the catalyst is used.

In accordance with the present invention, the post-titanated catalyst may be used to make the low MVTR resin in a gas phase process, a solution process or a slurry process. Use of slurry process conditions is preferred in the present invention.

Gas phase processes preferably are operated in a fluidized bed, with the recycle gas (primarily ethylene) stream providing the fluidization for the particulate bed of catalyst/polymer particles. In gas phase processes for polyethylene production, the catalyst is usually introduced separately into the reactor. Feed ethylene is monomer feed and is also used for cooling and fluidizing the reaction mixture. Reaction temperature is usually maintained around 80° C. to 120° C., preferably about 100° C. A conventional, single-stage centrifugal compressor circulates the gas and keeps the reaction pressure at 5 to 40 atm, preferably ca 2 MPa (20 atm). Polymer is formed as small granules of 0.5–1 mm diameter. Molecular weight distribution may be controlled by catalyst variables. Density may be controlled, within a range of about 0.915–0.970 g/cm$^3$, by the amount of comonomer added. In the present invention, a homopolymer HDPE is preferably produced, and accordingly preferably no comonomer is used. The granular polyethylene product is discharged intermittently into a tank where unreacted gas is removed. Hydrocarbons remaining within the polymer are purged with nitrogen. After blending and stabilization, the granular polymer is ready for processing or is pelletized. The pellets can then be formed into a film by extrusion or blow molding. The preparation of ethylene polymers in the absence of solvents under low pressures (~40–350 psi) in a fluid bed reactor, using various supported chromium containing catalysts, is disclosed in, for example, U.S. Pat. Nos. 3,023,203; 3,687,920; 3,704,287; and 3,709,853.

The process of the present invention may also be carried out in a solution polymerization process. Solution polymerization processes sometimes are called compact processes because they afford high production rates for a given reactor size. Ethylene and comonomer are dissolved in cyclohexane or isobutane or other solvent. Catalyst is introduced separately into the reactor and polymerization temperature is maintained between 150° C. and 250° C. Residence times may be as low as a few minutes, compared to 1–4 hours for slurry processes. Processes in which the polymer remains in solution can be highly automated, e.g., molecular weight can be controlled by monitoring viscosity, and reaction conditions can be changed via feedback loops. Only a maximum of 35–40% of polymer (18–25% normally) can be kept in solution, and high molecular weight products may create difficulties. Thus, this technology is preferred for the production of homogeneous polymers of comparatively low molecular weight and narrow molecular weight distribution for injection molding and film extrusion. In distinction to the slurry processes, there is no limitation in density for the solution process because polymers of lower density dissolve more readily in hydrocarbons. Therefore, copolymers with densities as low as 0.918 g/cm$^3$ can be made by solution polymerization.

A preferred polymerization technique or process for use in the present invention is the slurry polymerization process, also known as the particle form process. After catalyst activation, the catalyst is used to homopolymerize ethylene in a slurry process. Slurry polymerization techniques are well known in the art and are disclosed, for instance, in Norwood, U.S. Pat. No. 3,248,179, the disclosure of which is hereby incorporated by reference. Two preferred polymerization methods for the slurry process are those employing a loop reactor of the type disclosed in Norwood and those utilized in a plurality of stirred reactors either in series, parallel, or combinations thereof, wherein the reaction conditions are different in the different reactors. It is possible to copolymerize ethylene with a comonomer during the polymerization. In the slurry system (particle form process), a low boiling hydrocarbon such as isobutane, isopentane or cyclohexane, preferably isobutane, is used to dissolve the ethylene and suspend the catalyst and polymer particles. The slurry process preferably is fed high purity ethylene (such as 99.8% or higher purity) which is transported from ethylene plants. Ethylene gas, liquid isobutane or isopentane, and powdered catalyst are fed continuously into a loop reactor. The contents of the reactor are circulated rapidly by means of a propeller pump. The reactor loop is jacketed and cooling liquid is circulated through the jacket to remove the heat liberated by the polymerization. Ethylene concentration is maintained at a low level by automatic feed controls. As the polymerization proceeds, polymer particles form. The larger particles enter the settling zone, from which a concentrated slurry is discharged intermittently to remove product at the same rate at which it forms.

The concentrated particle form polyethylene-hydrocarbon slurry is discharged into a flash tank. Ethylene and low boiling hydrocarbon diluent flash overhead and are recycled. The polyethylene passes through the purge drying step and into an extruder where it is melted and then pelletized for storage and subsequent shipment in bags, boxes, or hopper cars. Small amounts of special additives such as antioxidants are added during extrusion. Since several metric tons of polyethylene are produced with each kg of catalyst, the residue remaining in the polymer is negligible.

Preferably the reaction conditions in the present process are adjusted so as to produce a homopolymer fluff having a melt index between 1.0 and 1.5 g/10 minutes. Reaction process conditions preferred include a pressure between 100 and 1000 psig, more preferably between 400 and 600 psig, and a reaction temperature between 200° F. and 240° F., more preferably between 210° F. and 230° F., and most preferably between 215° F. and 225° F. The ethylene concentration of the slurry loop reactor preferably is maintained between 3.5 and 5 wt. %, more preferably between 3.9 and 4.4 wt. %. The hydrogen concentration in the reactor preferably is kept between 0.4 and 1.0 wt. %, preferably 0.5 to 0.9 wt. %, and most preferably between 0.55 and 0.85 wt. %. The reactor solids preferably are maintained between 30 and 50%, more preferably between 40 and 50%, and most preferably between 40 and 45%. The resulting reactor fluff is dried prior to being pelletized. Pelletization can be accomplished using a twin screw compounding unit or other pelletization means.

HDPE materials made using the process and catalyst of the present invention have significant processing advantages. Two significant processing advantages are in the areas of reduced extrusion pressure and increased bubble stability. Extrusion pressure sometimes limits the maximum rate at which a film can be processed. Polymers produced in accordance with the process of the present invention have demonstrated extrusion pressures 5–15% below that of similar melt index (MI) commercial materials. This difference would be much greater for materials with 2–3 MWD, such as those referenced in the publication WO 96/19527.

The broader MWD resins produced by preferred embodiments of the process of the present invention also have better bubble stability (higher melt strength) as compared to narrow MWD HDPE materials. As mentioned previously, the combination of lower pressure generation during extrusion and higher melt strength allow the processor of the resin manufactured under the present invention to run these resins at higher processing outputs than present HDPE MVTR resins of comparable melt index values.

The resin formed by the process of the present invention is suitable for forming a film having an MVTR less than 0.35 grams of water times mil of thickness of the film per 100 square inches per day (g·mil/100 in.$^2$/day), preferably less than 0.25 g·mil/100 in.$^2$/day, and more preferably less than 0.175 g·mil/100 in.$^2$/day.

Figure 2:
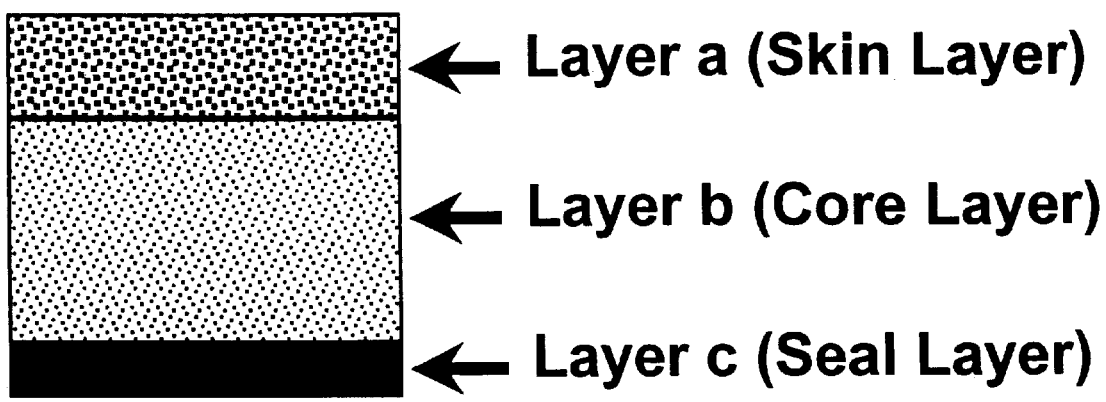
FIG. 2 is a schematic diagram showing a three-layer film version of the MVTR critical film.

Referring now to FIGS. 1 and 2, two alternate preferred product MVTR film constructions are shown. FIG. 1 is a five-layer coextruded MVTR film construction. FIG. 2 is a three-layer coextruded MVTR film. Known means may be used for coextruding resin to form the respective layers of the coextruded MVTR film illustrated in FIGS. 1 and 2. Also, the resin produced in accordance with the process of the present invention may be used in a monolayer film. However, commercially viability of monolayer applications is generally dependent on heat sealing qualities of HDPE. Applications of the resin produced by the present invention can be made to produce a monolayer film for barrier properties which when laminated to other films or paper to make a finished product, such as a packaging product.

One advantage we have found for the resins produced in accordance with the present invention is that they may be advantageously used to form film of low MVTR. Further, the resins produced in accordance with the present invention are advantageous in that the same resin may be used for the skin layer of the coextruded construction and the core layer(s). In typical prior art, a higher (2 g/10 min or higher) melt index HDPE resin is used in the skin layer of the construction and a lower (less than 1.5 g/10 min) melt index HDPE resin is used in the core layer(s) in order to achieve lower MVTR than a film using the lower MI in both the skin and core layers.

FIG. 1 illustrates a preferred five-layer construction. The outer layer or outside skin of the film is layer 1. The core layers are layers 2, 3 and 4. The inside layer, which is referred to as the seal layer, and may come into contact with foodstuffs, is layer 5. Preferably, layer 1 is 10% to 20% of the total thickness, layers 2, 3 and 4 preferably are 60% to 80% of the thickness, and layer 5 is 10% to 20% of the thickness of the product film.

As referenced in the August 1999 issue of *Plastics Technology* in the article "Keep It Dry" and from common knowledge in the MVTR film market, in the five-layer construction, Layer 1, the skin layer or outside layer of the film is generally a HDPE having a melt index of between 2 and 6 g/10 min. The three core layers, Layers 2, 3 and 4 in the figure, generally consist of a HDPE having a melt index between about 0.5 and 1.5, preferably approximately 1.0 g/10 min. The core layers can be fed by three separate extruders or may be formed by splitting the stream from one extruder into two or three independent layers prior to or inside the die. As mentioned above, layer 5 in FIG. 1 is the seal layer in the coextruded construction. The seal layer may consist of a single resin, such as a high ethylene vinyl acetate copolymer or may be a blend of several resins. Resins used in the seal layer generally demonstrate a low crystallinity and as such do not appreciably contribute to the MVTR performance of the film.

FIG. 2 illustrates an alternate preferred construction, which is three layers. The outer layer or outside skin of the film in FIG. 2 is layer a. The core layer is layer b. The inside layer, which is referred to as the seal layer, and may come in contact with foodstuffs, is layer c. Preferably, layer a is 10% to 20% of the total thickness, layer b preferably is 60% to 80% of the thickness, and layer c is 10% to 20% of the thickness of the product film.

As is the case in the five-layer construction, the three-layer construction generally utilizes a 2 to 6 g/10 min. melt index HDPE, layer a in FIG. 2, in the skin layer. The core layer in the three-layer construction, layer b, is a HDPE generally having a melt index of about 0.5 to 1.5, preferably about 1.0 g/10 min. The seal layer, layer c, in the three-layer construction generally utilizes the same type of resins and resin blends commonly found in the five-layer construction.

An unexpected advantage we have found for the resins produced by the present invention is that the same grade HDPE may be used for both layer a and layer b in the three-layer construction and in layers 1, 2, 3 and 4 and achieve substantially equivalent barrier properties to the conventional systems requiring different grades of HDPE in the skin and core layer(s). Using the same grade HDPE is attractive for film manufacturers for convenience in both production of film and the inventory of resin. Since a HDPE resin produced by the present invention eliminates the need for a separate skin and core layer HDPE resin, film processors can reduce the number of HDPE resins they must inventory and the need for tracking two different HDPE resins within the transfer systems of the plant is eliminated.

We have found that, using the resin produced in accordance with the present invention, the high MI outside skin (layer a in the three-layer coextrusion and layer 1 in the five-layer coextrusion) of 2 MI or greater per the prior art can be replaced by an approximately 1 MI HDPE resin produced in accordance with the present invention. And, the same 1 MI resin can be used for the core layers, and yet still achieve attractive performance, such as low MVTR for the overall film.

EXAMPLES

Example 1
Post Titanated Catalyst

The catalyst of this example was produced using Grace Davison 963 Magnapore. The catalyst was prepared by first pre-drying (two separate 350 lb batches) the Davison 963, as received from the vendor, with air containing less than 3.0 ppm moisture in a fluidized bed (60 ACFM flow) for 6 hours at 340° F. The fluidizing gas is then switched to nitrogen and the catalyst is cooled to below 300° F. The Davison 963 Magnapore catalyst, as received from the vendor, contained 1 wt. % chromium, and 2.5 wt. % titanium. The post-titanation of this example added an additional 6 wt. % titanium to yield a catalyst containing a total titanium content of 8.5 wt. %. The post-titanation was accomplished in a mixing vessel using the pre-dried Magnapore catalyst, isopentane, and tetraisopropyltitanate (TIPT). 600 lbs of the Magnapore was added to the mix vessel and the stirrer is started at low speed. 462 gallons isopentane were added to the vessel. Then 46.3 gallons of TIPT were added to the vessel. Stirrer speed was increased to high speed for 30 minutes. After mixing for 30 minutes, the resultant catalyst was then dried using high purity nitrogen for a minimum of 6 hours or until the volatiles were less than 3.5%. The post-titanated catalyst was then activated in a fluidized bed. The activation involved first preheating the catalyst in a high nitrogen environment to 650° F. for 3 hours and then continued by switching to an air environment and heating the catalyst with a ramped profile to a peak temperature of 1300° F. The temperature was held at 1300° F. for 13 hours. The temperature was then ramped down to 400° F. Fluidizing gas was then switched to nitrogen for cooling to below 300° F. The activated catalyst was then placed in a storage vessel under a nitrogen blanket to allow cooling to room temperature prior to use.

Comparative Example 1
Non-Post-Titanated Catalyst

The catalyst of this example was produced using Grace Davison 963 Magnapore. The Davison 963 Magnapore catalyst, as received from the vendor, contained 1 wt. % chromium and 2.5 wt. % titanium. The catalyst was then activated in a fluidized bed. The activation involved first preheating the catalyst in a high nitrogen environment to 650° F. for 3 hours and then continued by switching to an air environment and heating the catalyst with a ramped profile to a peak temperature of 1300° F. The temperature was held at 1300° F. for 13 hours. The temperature was then ramped down to 400° F. Fluidizing gas was then switched to nitrogen for cooling to below 300° F. The activated catalyst was then placed in a storage vessel under a nitrogen blanket to allow cooling to room temperature prior to use.

Example 2
Process Using Post-Titanated Catalyst

The activated catalyst from Example 1 was transferred to a catalyst feed vessel and slurried with isobutane. This catalyst slurry was then fed to a slurry loop reactor also known as a particle form loop reactor. Reaction process conditions were adjusted to produce a homopolymer reactor fluff with a melt index between 1.0 and 1.5 g/10 minutes. Reaction process condition target ranges and actual values are as follows:

|  | Target Range | Actual |
|---|---|---|
| Reaction Temperature, ° F. | 210–225 | 216–219 |
| Ethylene Concentration, wt. % | 3.5–5.0 | 3.9–4.4 |
| Hydrogen Concentration, wt. % | 0.4–1.0 | 0.55–0.85 |
| Reactor Solids, wt. % | 30–50 | 40–45 |

The reactor fluff was then dried and conveyed to a twin screw compounding unit for pelletizing.

Comparative Example 2
Using Non-Post-Titanated Catalyst

The activated catalyst from Comparative Example 1 was transferred to a catalyst feed vessel and slurried with isobutane. This catalyst slurry was then fed to a slurry loop reactor also known as a particle form loop reactor. Reaction process conditions were adjusted to produce a homopolymer reactor fluff with a melt index between 1.0 and 1.5 g/10 minutes. Reaction process condition target ranges and actual values are as follows:

|  | Target Range | Actual |
|---|---|---|
| Reaction Temperature, ° F. | 220–235 | 223–226 |
| Ethylene Concentration, wt. % | 3.5–5.0 | 3.9–4.4 |
| Hydrogen Concentration, wt. % | 0.4–1.0 | 0.55–0.85 |
| Reactor Solids, wt. % | 30–50 | 40–45 |

The reactor fluff was then dried and conveyed to a twin screw compounding unit for pelletizing.

Example 3
Production of Film from the Polyethylene made Using Post-Titanated Catalyst and from the Polyethylene made Using Non-Titanated Catalyst in a Small Scale Film was produced by the blown film process using the following equipment and conditions. Film was produced from the polyethylene polymer of Comparative Example 2 (using non-post-titanated catalyst) and from the polyethylene polymer of Example 2 (using catalyst with 6% additional titanium).

Equipment
60 mm 23:1 L/D Kiefel extruder
100 mm Kiefel die with a 1.0 mm die gap
Macro dual lip air ring
Conditions

| Rate, lbs/hr | 125 |
|---|---|
| Gauge, mils | 1.8 |
| BUR | 2.0 |
| Barrel Temperature, ° F. | 350, 400, 400, 400, 400 |
| Die Temperature, ° F. | 400, 400 |
| Air Ring Air Temperature, ° F. | 60 |
| Frost Line Height, inches | 15.25 |
| Screw speed, rpm | 50 |

As shown in the following table, the film made from the polyethylene polymer of Example 2 (using post-titanated catalyst) has improved barrier properties as compared to the film made from the polyethylene of Comparative Example 2 (made using the Catalyst without post-titanation).

|  | Film from Comparative Example 2 Polymer made using Non-Post-Titanated Catalyst | Film from Example 2 Polymer made using Post Ti Catalyst |
|---|---|---|
| Melt Index, g/10 min | 1.12 | 0.85 |
| HLMI, g/10 min | 48.2 | 63.4 |
| MFR | 43 | 74.6 |
| Density, g/cc | 0.962 | 0.962 |
| Mn | 22,597 | 17.891 |
| Mw | 128,647 | 120,721 |
| MWD | 5.7 | 6.8 |
| MVTR, g · mil/100 in.$^2$/day | 0.276 | 0.238 |

Example 4
Production of Film from the Polyethylene made Using Post-Titanated Catalyst and from the Polyethylene made Using Non-Titanated Catalyst in a Large Scale Film was produced by the blown film process using the following equipment and conditions. Film was produced from commercial polyethylene polymer using non-post-titanated catalyst and from the polyethylene polymer using catalyst with 6% additional titanium.

Equipment
60 mm 23:1 L/D Kiefel extruder
100 mm Kiefel die with a 1.0 mm die gap
Macro dual lip air ring
Conditions

| Rate, lbs/hr | 100 |
|---|---|
| Gauge, mils | 1.30 |
| BUR | 2.0 |
| Barrel Temperature, ° F. | 350, 400, 400, 400, 400 |
| Die Temperature, ° F. | 400, 400 |
| Air Ring Air Temperature, ° F. | 56 |
| Frost Line Height, inches | 13.0 |
| Screw speed, rpm | 38 |

As shown in the following table, the film made from the polyethylene polymer using post-titanated catalyst has improved barrier properties as compared to the film made from the polyethylene of made using the 1300° F. Magnapore Catalyst without post-titanation.

|  | Film from Commercial Polymer made using Magnapore Catalyst | Film from Commercial Polymer made using Post Ti Catalyst (Average of seven (7) lots) |
|---|---|---|
| Melt Index, g/10 min | 1.05 | 1.09 |
| HLMI, g/10 min | 46.0 | 60.3 |
| MFR | 43.9 | 55.3 |
| Density, g/cc | 0.962 | 0.962 |
| Mn | 26,492 | 16,323 |
| Mw | 125,074 | 121,125 |
| MWD | 4.7 | 7.4 |
| MVTR, g · 100 in.$^2$/day | 0.291 | 0.268 |

What is claimed is:

1. A process for polymerizing ethylene to form a polyethylene homopolymer having a MWD greater than 4 and suitable for forming a film having an MVTR less than 0.3 g mil/100 in$^2$/day, which comprises contacting the ethylene under slurry or gas phase reaction conditions with a chromium-silica cogel catalyst containing titanium, wherein the catalyst contains titanium added in at least two steps: (1) titanium added as part of a first cogel formation, comprising chromium, titanium and silica, and (2) titanium added in a post-titanation step after the first cogel is formed and dried.

2. The process in accordance with claim 1 wherein the amount of titanium in the first cogel is between 1 wt. % and 5 wt. % based on the dried first cogel, and the amount of titanium in the post-titanated catalyst is between 5 wt. % and 15 wt. %.

3. The process in accordance with claim 1 wherein the amount of titanium in the first cogel is between 1.5 wt. % and 4.0 wt. % based on the dried first cogel, and the amount of titanium in the post-titanated catalyst is between 6 wt. % and 12 wt. %.

4. The process in accordance with claim 3 wherein the post-titanated catalyst is calcined at 1200° F. to 1400° F.

5. The process in accordance with claim 1 wherein reaction conditions are slurry.

6. The process in accordance with claim 1 wherein the MWD is greater than 6.

7. The process in accordance with claim 1 wherein the MVTR is less than 0.25 g·mil/100 in$^2$/day.

* * * * *